United States Patent
Smith

(10) Patent No.: US 10,813,292 B2
(45) Date of Patent: Oct. 27, 2020

(54) HYDRAULIC FEED ROLL ADJUSTMENT SYSTEM

(71) Applicant: CNH Industrial America LLC, New Holland, PA (US)

(72) Inventor: Kevin M. Smith, Narvon, PA (US)

(*) Notice: Subject to any disclaimer, the term of this patent is extended or adjusted under 35 U.S.C. 154(b) by 452 days.

(21) Appl. No.: 14/966,182

(22) Filed: Dec. 11, 2015

(65) Prior Publication Data

US 2017/0164558 A1 Jun. 15, 2017

(51) Int. Cl.
*A01F 15/00* (2006.01)
*A01F 15/10* (2006.01)
*A01F 15/08* (2006.01)

(52) U.S. Cl.
CPC .......... *A01F 15/106* (2013.01); *A01F 15/085* (2013.01)

(58) Field of Classification Search
CPC ... A01F 15/106; A01F 15/085; A01F 15/0833
See application file for complete search history.

(56) References Cited

U.S. PATENT DOCUMENTS

| | | | |
|---|---|---|---|
| 5,622,104 A | 4/1997 | Viesselmann et al. | |
| 6,073,426 A | 6/2000 | Mesmer et al. | |
| 6,431,981 B1 | 8/2002 | Shinners et al. | |
| 6,651,416 B2 | 11/2003 | Trelstad et al. | |
| 2014/0165528 A1 | 6/2014 | Olander et al. | |
| 2017/0049058 A1* | 2/2017 | Eubanks | A01F 15/0715 |

* cited by examiner

*Primary Examiner* — Travis C Ruby
(74) *Attorney, Agent, or Firm* — Patrick Sheldrake; Peter Zacharias

(57) ABSTRACT

A hydraulic feed roll adjustment system includes a feed roll system, a power take off system, and at least a first controller. The feed roll system includes a feed roll, a motor and a control valve. The feed roll is positioned transversely between at least two side walls and is capable of rotation about a feed roll axis. The motor is operably connected to the fed roll and in fluid communication with a hydraulic circuit. The motor rotates the feed roll about the axis. The control value controls the rate of fluid flow through the hydraulic circuit. The power take off system includes a power take off shaft capable of rotation about a power take off axis. The at least a first controller is in electronic communications with the control value and is capable of adjusting the rotational speed of the feed roll.

6 Claims, 4 Drawing Sheets

HYDRAULIC FEED ROLL ADJUSTMENT SYSTEM

TECHNOLOGY FIELD

The present disclosure relates generally to a system for adjusting the rotational speed of a hydraulic powered feed roll in a harvester.

BACKGROUND

For many years harvesters, such as agricultural balers, have been used to consolidate and package crop material so as to facilitate the storage and handling of the crop material for later use. Usually, a mower-conditioner cuts and conditions the crop material for windrow drying in the sun. When the cut crop material is properly dried, a harvester, such as a baler, travels along the windrows to pick up the crop material and form it into compact bales. In most cases, the harvester is towed by a tractor, which can provide mechanical, electrical, and hydraulic means to control the harvester.

In a conventional harvester, the cut crop material is gathered at the front of the harvester from along the ground by a pickup assembly, and passed into a crop feeding channel where the material can be further cut before being introduced into a bale-forming chamber. Once in the bale chamber, the processed crop material is formed in a bale of the appropriate shape, and typically the bale forming is terminated according to a diameter or weight criterion.

This process is assisted by a feed roll which draws crop material from the pickup assembly into the crop feeding channel, where the crop material is optionally cut into smaller pieces by a series of knife blades before entering into the bale chamber. Typically, the rotation of the feed roll is controlled by a hydraulic motor which is driven by the electro-hydraulic system (EHR) in the associated tractor. Conventional feed rolls have a simple binary control, where the feed roll is activated when the EHR is on. In order to maximize feeding performance and safety, there is a need to synchronize the speed of the rotation of the feed roll with the relative speed of the mechanical drive of the tractor.

SUMMARY

The disclosure relates to a system comprising a feed roll system comprising: (i) a feed roll, positioned transversely between at least two sidewalls, capable of rotation about a feed roll axis; (ii) a motor, operably connected to the feed roll and in fluid communication with a hydraulic circuit, the motor capable of rotating the feed roll about the axis; and (iii) a control valve, operably connected to and capable of controlling the rate of fluid flow through the hydraulic circuit; a power take off (PTO) system comprising a PTO shaft capable of rotation about a PTO axis, and at least a first controller, in electronic communication with the control valve, capable of adjusting the rotational speed of the feed roll about the feed roll axis; wherein the at least two sidewalls are configured for attachment to a frame of a harvester.

In some embodiments, the motor increases the rotational speed of the feed roll about the axis as the rate of fluid flow through the hydraulic circuit increases; and wherein the motor decreases the rotational speed of the feed roll about the axis as the rate of fluid flow through the hydraulic circuit decreases.

In some embodiments, the control valve comprises: a first position, wherein the control valve is maximally open, and the rate of fluid flow through the hydraulic circuit is unrestricted; a second position, wherein the control valve is maximally closed, and the rate of fluid flow through the hydraulic circuit is zero or is approximately zero; and a plurality of positions between the first position and the second position, wherein the control valve is from about maximally open to about maximally closed, and the rate of fluid flow through the hydraulic circuit is proportional to the open percentage of the control valve.

In some embodiments, the at least a first controller adjusts the rotational speed of the feed roll by adjusting the position of the control valve, whereby adjusting the rate of fluid flow through the hydraulic circuit causes the motor to adjust the rotational speed of the feed roll about the axis.

In some embodiments, the PTO system further comprises a speed sensor capable of determining the real-time rotational speed of the PTO shaft; and wherein the at least a first controller is in electronic communication with the control valve and the speed sensor.

In some embodiments, the feed roll system further comprises a control valve sensor, in electronic communication with the at least a first controller, capable of determining the position of and the rate of fluid flow through the control valve.

In some embodiments, the at least a first controller is capable of determining the rate of fluid flow through the control valve through the control valve sensor; and wherein the at least a first controller is capable of adjusting the position of the control valve such that the ratio of the rotational speed of the PTO shaft to the rotational speed of the feed roll is maintained or approximately maintained.

In some embodiments, the feed roll system further comprises a feed roll sensor, in electronic communication with the at least a first controller, capable of determining the rotational speed of the feed roll about the axis.

In some embodiments, the at least a first controller is capable of determining the rotational speed of the feed roll by the feed roll sensor, and wherein the at least a first controller is capable of adjusting the position of the control valve such that the ratio of the rotational speed of the PTO shaft to the rotational speed of the feed roll is maintained or approximately maintained.

In some embodiments, the feed roll system further comprises a control valve sensor, in electronic communication with the at least a second controller, capable of determining the position of and the rate of fluid flow through the control valve; and wherein the at least a first controller and the at least a second controller are in electronic communication.

In some embodiments, the at least a second controller is capable of determining the rotational speed of the feed roll by the feed roll sensor, and wherein the at least a first controller is capable of adjusting the position of the control valve such that the ratio of the rotational speed of the PTO shaft to the rotational speed of the feed roll is maintained or approximately maintained.

The present disclosure also relates to a harvester comprising: a feed roll system comprising: (i) a feed roll, positioned transversely between at least two sidewalls, capable of rotation about a feed roll axis; (ii) a motor, operably connected to the feed roll and in fluid communication with a hydraulic circuit, the motor capable of rotating the feed roll about the axis; and (iii) a control valve, operably connected to and capable of controlling the rate of fluid flow through the hydraulic circuit; a power take off (PTO) system comprising a PTO shaft capable of rotation about a PTO axis, and at least a first controller, in electronic communication with the control valve, capable of adjusting the rotational speed of the feed roll about the feed roll axis; wherein the at least two sidewalls are configured for attachment to a frame of the harvester; and wherein the motor increases the rotational speed of the feed roll about the axis as the rate of fluid flow through the hydraulic circuit increases; and wherein the motor decreases the rotational speed of the feed roll about the axis as the rate of fluid flow through the hydraulic circuit decreases.

In some embodiments, the control valve comprises: (i) a first position, wherein the control valve is maximally open, and the rate of fluid flow through the hydraulic circuit is unrestricted; (ii) a second position, wherein the control valve is maximally closed, and the rate of fluid flow through the hydraulic circuit is zero or is approximately zero; and (iii) a plurality of positions between the first position and the second position, wherein the control valve is from about maximally open to about maximally closed, and the rate of fluid flow through the hydraulic circuit is proportional to the open percentage of the control valve; and wherein the at least a first controller adjusts the rotational speed of the feed roll by adjusting the position of the control valve, whereby adjusting the rate of fluid flow through the hydraulic circuit causes the motor to adjust the rotational speed of the feed roll about the axis.

In some embodiments, the harvester further comprises: (i) a speed sensor capable of determining the real-time rotational speed of the PTO shaft; and (ii) a control valve sensor capable of determining the position of and the rate of fluid flow through the control valve; wherein the at least a first controller is in electronic communication with the control valve, the speed sensor, and the control valve sensor; and wherein the at least a first controller is capable of determining the rate of fluid flow through the control valve through the control valve sensor; and wherein the at least a first controller is capable of adjusting the position of the control valve such that the ratio of the rotational speed of the PTO shaft to the rotational speed of the feed roll is maintained or approximately maintained.

In some embodiments, the harvester further comprises: (i) a speed sensor capable of determining the real-time rotational speed of the PTO shaft; and (ii) a feed roll sensor capable of determining the rotational speed of the feed roll about the axis; wherein the at least a first controller is in electronic communication with the control valve, the speed sensor, and the feed roll sensor; and wherein the at least a first controller is capable of determining the rotational speed of the feed roll by the feed roll sensor, and wherein the at least a first controller is capable of adjusting the position of the control valve such that the ratio of the rotational speed of the PTO shaft to the rotational speed of the feed roll is maintained or approximately maintained.

In some embodiments, the harvester further comprises: (i) a speed sensor capable of determining the real-time rotational speed of the PTO shaft; (ii) a feed roll sensor capable of determining the rotational speed of the feed roll about the axis; and (iii) at least a second controller; wherein the at least a first controller is in electronic communication with the control valve, the speed sensor, and the at least second controller; wherein the at least a second controller is in electronic communication with the feed roll sensor, and the at least first controller; wherein the at least a second controller is capable of determining the rotational speed of the feed roll by the feed roll sensor, and wherein the at least a first controller is capable of adjusting the position of the control valve such that the ratio of the rotational speed of the PTO shaft to the rotational speed of the feed roll is maintained or approximately maintained.

The present disclosure also relates to a method of controlling the rotational speed of a feed roll comprising: determining, by a speed sensor, the rotational speed of a PTO shaft; determining the rotational speed of a feed roll; calculating, by at least a first controller, the ratio of the rotational speed of the PTO shaft to the rotational speed of the feed roll; adjusting, by a control valve, the rotational speed of the feed roll.

In some embodiments, the rotational speed of the feed roll is adjusted such that the ratio of the rotational speed of the PTO shaft to the rotational speed of the feed roll is maintained or approximately maintained.

In some embodiments, the step of determining the rotational speed of the feed roll comprises: determining, by a control valve sensor in electronic communication with the at least a first controller, the position of and the rate of fluid flow through a control valve.

In some embodiments, the step of determining the rotational speed of the feed roll comprises: determining, by a feed roll sensor, the rotational speed of a feed roll.

In some embodiments, the step of determining the rotational speed of the feed roll comprises: determining, by a control valve sensor in electronic communication with the at least a second controller, the position of and the rate of fluid flow through a control valve; wherein the at least a first controller and the at least a second controller are in electronic communication.

DETAILED DESCRIPTION

Figure 1:
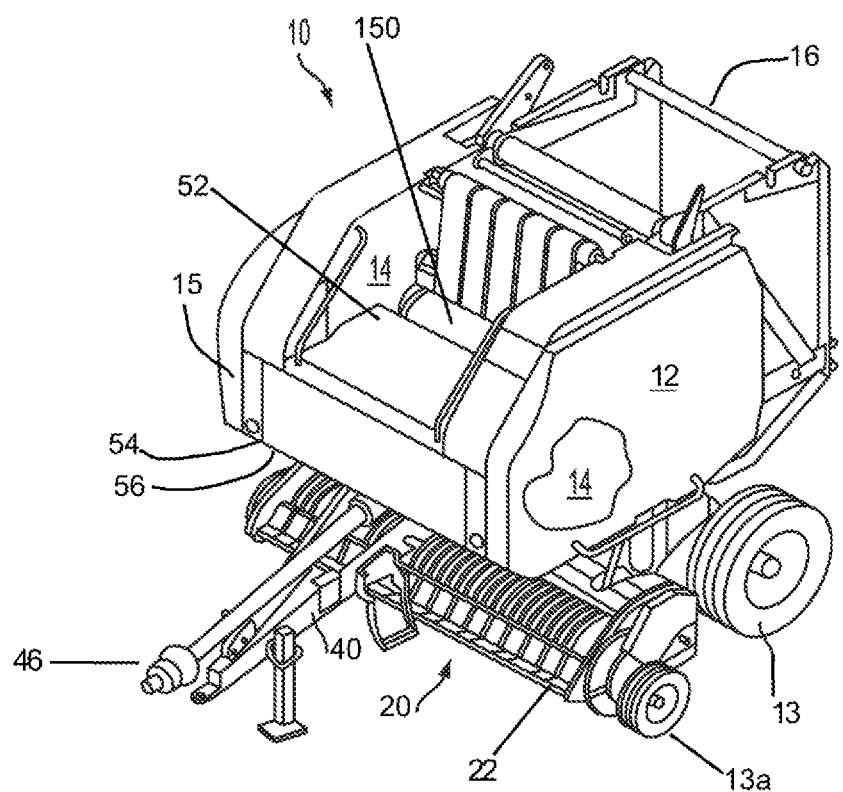
FIG. 1 depicts a static image of a conventional harvester.

Various terms relating to the methods and other aspects of the present invention are used throughout the specification and claims. Such terms are to be given their ordinary meaning in the art unless otherwise indicated. Other specifically defined terms are to be construed in a manner consistent with the definition provided herein.

As used in this specification and the appended claims, the singular forms "a," "an," and "the" include plural referents unless the content clearly dictates otherwise.

The term "more than 2" as used herein is defined as any whole integer greater than the number two, e.g. 3, 4, or 5.

The term "plurality" as used herein is defined as any amount or number greater or more than 1.

The terms "left" or "right" are used herein as a matter of mere convenience, and are determined by standing at the rear of the machine facing in its normal direction travel. Likewise, "forward" and "rearward" are determined by the normal direction of travel. "Upward" and "downward" orientations are relative to the ground or operating surface as are any references to "horizontal" or "vertical" planes.

The term "harvester" as used herein is defined as a machine designed to consolidate and/or package material so as to facilitate the storage and handling of the material for later use. In some embodiments, the harvester is used to harvest agricultural material. In some embodiments, the harvester is an agricultural baler, a waste baler, a square baler, a round baler, or a combine comprising a baling mechanism.

The terms "material" or "crop material" as used herein are defined as a numerous individual items that are harvested or collected by the harvester. In some embodiments, the material is agricultural crop, such as hay or silage. In some embodiments, the material is biomass.

The term "pickup assembly" as used herein is defined as an element responsible for collecting material from the ground over which the harvester operates. A harvesting assembly includes a mechanism to pick up the material from the ground, and such mechanisms are well known in the agricultural industry. Reference is made, for example, to U.S. Patent Application No. US20130305683 A1 that illustrates such mechanisms, the disclosures of which are incorporated herein by reference in their entirety.

The term "bale chamber" as used herein is defined as any space within the harvester that is capable of containing a bale of harvested material. In some embodiments, the sides of the bale chamber are defined by oppositely facing side walls. In some embodiments, the bale chamber is also defined by at least a portion of its front region by an inlet through which harvester material or crop enters. In some embodiments, the front region of a first bale chamber is defined by an inlet or entry point which is in operable connection to any crop feeder mechanism disclosed herein. In some embodiments, the front region of a first bale chamber is defined by an inlet or entry point which is in operable connection to an exit of a crop harvesting assembly. In some embodiments, the bale chamber can be used form round or square bales of various dimensions. In some embodiments, the bale chamber is positioned rearward from the crop feeder mechanism and comprises a net wrapping mechanism. In some embodiments, the bale chamber comprises a die or a plurality of dies.

The term "net wrapping mechanism" as used herein is defined as a mechanical device or assembly that uses net wrapping material to wrap a formed bale. In some embodiments, the net wrapping mechanism comprises at least one feed roller, a feed plate, at least one compression roller, a cutting knife, and at least one actuator; wherein wrapping material is passed around the at least one feed roller through the feed plate. In some embodiments, the net wrapping mechanism is positioned at or proximate to at least one rear opening of the crop feeder mechanism. In some embodiments, the net wrapping mechanism is optionally positioned on the interior or the exterior of a harvester.

The term "wrapping material" as used herein is defined as a net, mesh, twine, plastic film, or other material that is used for the wrapping of a bale in order to maintain the shape and density of said bale and optionally protect it from weather or other external conditions.

The term "feed roll" as used herein is defined as a roll which assist the movement of crop material into a crop feeding channel. In some embodiments, the feed roll is rotated by an attached hydraulic motor. In some embodiments, the feed roll is attached is a series of rotor blades.

The term "power take off" or "PTO" as used herein is defined as system for transferring power from a power source to an attached mechanical device. For example, PTO systems are commonly used to transfer power from a tractor engine to an attached harvester. A "PTO shaft" is a type of drive shaft that can be easily connected and disconnected to a corresponding PTO system.

Discussions herein utilizing terms such as, for example, "processing," "computing," "calculating," "determining," or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Some embodiments may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device.

In some embodiments, the medium may be or may include an electronic, magnetic, optical, electromagnetic, InfraRed (IR), or semiconductor system (or apparatus or device) or a propagation medium. Some demonstrative examples of a computer-readable medium may include a semiconductor or solid state memory, magnetic tape, a removable computer diskette, a Random Access Memory (RAM), a Read-Only Memory (ROM), a rigid magnetic disk, an optical disk, or the like. Some demonstrative examples of optical disks include Compact Disk-Read-Only Memory (CD-ROM), Compact Disk-Read/Write (CD-R/W), DVD, or the like.

In some embodiments, a processing system comprises a processing device suitable for storing and/or executing program code and may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used.

The term "real-time" and the phrase "in real-time" as used herein are defined as a way of describing a process, event, or action that occurs simultaneously with the process of actively forming a bale in a bale chamber. In some embodiments, various sensors, for example a rotation sensor, continuously sense information about the rotation angle of a bottom floor assembly and transmit that information to a controller in real-time. In some embodiments, an operator may adjust inputted values in an operator interface in real-time.

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Furthermore, the various components shown or described herein for any specific application of this invention can be varied and the practice of a specific application of any element may already be widely known or used in the art by persons skilled in the art and each will likewise not therefore be discussed in significant detail.

Agricultural balers, such as round or square balers, are well known in the agricultural industry, and the instant invention can be used with substantially any of such machines. Reference is made, for example, to U.S. Pat. Nos. 8,539,787; 8,770,102; 6,877,304; 6,840,023; 6,688,092; 6,651,416; 6,644,006; 6,295,797; and 6,000,206 that illustrate such balers, the disclosures of which are incorporated herein by reference in their entirety. Embodiments of the present invention are particularly well suited, but in no way limited to, use with agricultural balers. The present invention may also find utility in agricultural harvesters including, for example, a waste baler, a cotton harvester, or a combine. In some embodiments, the combine comprises a baling mechanism.

The present disclosure relates to a system in a harvester that controls the rotational speed of a feed roll, such that the speed of the feed roll can match the speed of the mechanical drive of the harvester or associated tractor, for example, a PTO shaft. In some embodiments, the system can adjust the rotational speed of the feed roll such that the speed of the feed roll can match the speed of the mechanical drive in real time. In some embodiments, the system can adjust the rotational speed of the feed roll such that the ratio of the rotational speed of the mechanical drive to the rotational speed of the feed roll is maintained or approximately maintained. In some embodiments, when the mechanical drive is off or otherwise not in motion, the feed roll is not in motion. In some embodiments, when the mechanical drive increases in speed, the rotational speed of the feed roll increases. In some embodiments, when the mechanical drive decreases in speed, the rotational speed of the feed roll decreases. When the rotational speed of the feed roll is synchronized with the relative speed of the mechanical drive of the harvester or associated tractor, feeding performance of the harvester can be maximized.

In some embodiments, the rotation of the feed roll is controlled by an attached hydraulic motor. In some embodiments, a hydraulic control valve controls the speed of the motor by adjusting the hydraulic fluid flow that the motor receives. In some embodiments, one or more electronic controllers are capable of adjusting the position of the control valve, and therefore adjusting the rotational speed of the feed roll.

In some embodiments, the controller is electronically connected to the control valve, a speed sensor capable of determining the rotational speed of a PTO shaft, and a control valve sensor capable of determining the position of and the rate of fluid flow through the control valve. In some embodiments, the controller is capable of adjusting the control valve based on the speed of the PTO shaft and the rate of fluid flow through the control valve such that the ratio of the rotational speed of the PTO shaft to the rotational speed of the feed roll is maintained or approximately maintained during the operation of the system.

In some embodiments, the controller is electronically connected to the control valve, a speed sensor capable of determining the rotational speed of a PTO shaft, and a feed roll sensor capable of determining the rotational speed of the feed roll. In some embodiments, the controller is capable of adjusting the control valve based on the speed of the PTO shaft and the rotational speed of the feed roll such that the ratio of the rotational speed of the PTO shaft to the rotational speed of the feed roll is maintained or approximately maintained during the operation of the system.

In some embodiments, the system comprises two controllers in electronic commination with each other. In some embodiments, one controller is located in the harvester while the other controller is located in the associated tractor. The two controllers are in electronic communication with each other, for example, by connection via ISOBUS. The controller located in the tractor is electronically connected to the control valve and a speed sensor capable of determining the rotational speed of a PTO shaft. The controller located in the harvester is electronically connected to a feed roll sensor capable of determining the rotational speed of the feed roll. The controller located in the tractor is capable of adjusting the control valve based on information from the controller located in the harvester and the speed sensor, such that the ratio of the rotational speed of the PTO shaft to the rotational speed of the feed roll is maintained to approximately maintained during the operation of the system.

In some embodiments, "during the operation of the system" may comprise any and all time intervals when the system or harvester is in operation, actively receiving hydraulic or electric power, or actively performing a task. In some embodiments, "during the operation of the system" refers to a time interval when the system or harvester is in operation and exposed to sufficient external conditions that would alter the ratio of the rotational speed of the PTO shaft to the rotational speed of the feed roll.

In some embodiments, at least one preset ratio is programmed into the controller, such that the controller is capable of adjusting the control valve so that the current ratio of the rotational speed of the PTO shaft to the rotational speed of the feed roll equals or approximately equals the at least one preset ratio during the operation of the system.

Referring to the drawings, FIG. 1 depicts an example of a round baler. The round baler, generally designated 10 is enclosed by a main frame 12, comprising a plurality of rigid structural elements including a pair of side walls 14. Main frame 12 is supported by a pair of rear wheels 13. A forwardly mounted hitch 40, integrated with the main frame 12, provides for connection to a tractor, for example. As shown, a power take off (PTO) shaft 46, is located herein about the hitch 40. In other balers, the PTO shaft may be located and connected to the tractor below the hitch. The PTO shaft draws energy from a tractor driving the hitch and transfer that energy to drive mechanisms in the baler 10. Rear side 16, typically comprises a tailgate what is closed during bailing and opened to eject finished bales. In conventional balers, storage to house spare rolls of wrapping material is typically located about the tailgate. The front side 15 of the baler faces the rear of a tractor as connected to by the hitch 40 and the PTO shaft 46. At the bottom of the front side, between a front pair of wheels 13a, and mounted to the mainframe 12, is the pickup 20. The pickup 20 is supported by the pair of front wheels 13a. Pickup tines 22 wrap around and connect within the pickup 20. The tips of the tines 22 are movable along a predetermined path along the ground to lift crop material from the ground and deliver it rearward along a generally horizontal path towards a floor roll (not shown)

at the bottom of the later, which is rotatably mounted on main frame 12. During baling, the floor roll conveys crop material further rear into a bale chamber where belts then urge the material upwardly and forwardly into engagement with sledge rolls. The sledge rolls coil crop material in a round direction to form and add to a bale acre. Continued feeding by pick tines 22 urge additional crop material into the forming bale in a generally spiral fashion growing the bale core. A wrapping assembly 52 comprises an active roll cavity 54. When the baler is in use, the active roll cavity 54 would house a roll of wrapping material which would passed around a spreader roll 150 as wrapping material is fed into a feeding entry 56.

Figure 2:
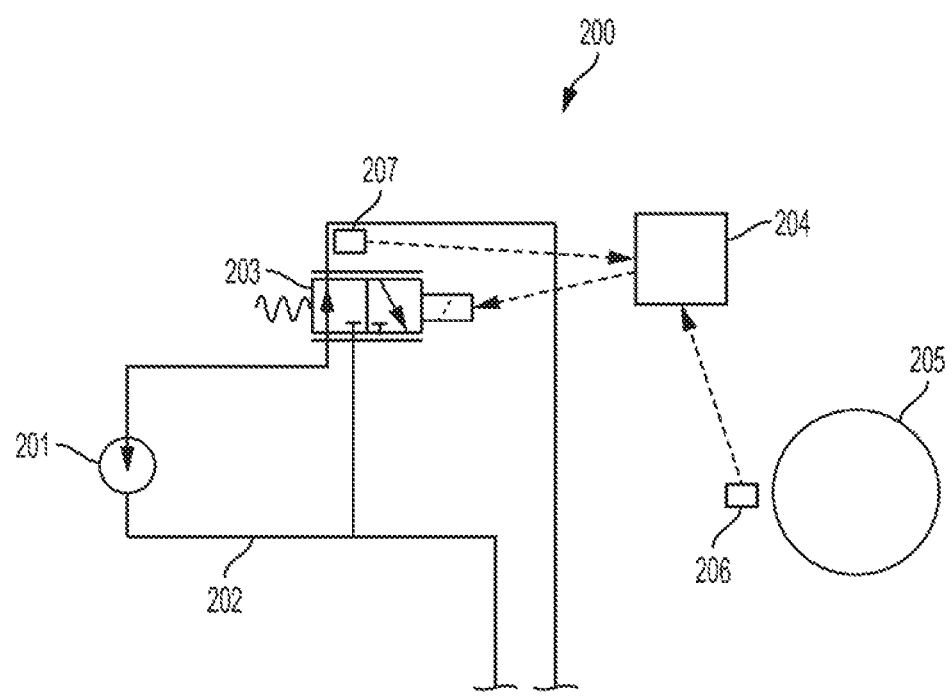
FIG. 2 depicts a hydraulic schematic showing a system with a speed sensor and a control valve sensor.

FIG. 2 depicts an embodiment of a hydraulic control system in a harvester, generally labeled 200. A hydraulic motor 201 is operable connected to and capable of rotating a feed roll (not shown), and is powered by hydraulic fluid moving through a hydraulic circuit 202 that is a part of a larger tractor EHR system (not shown). A control valve 203 is positioned such that it controls the rate of fluid flow moving through the motor 201, and thus the rotational speed of the feed roll. A controller 204 is in electronic communication with the control valve 203 and can adjust the position of the valve 203 to vary the rate of fluid flow moving through the motor 201. In this manner the controller 204 can adjust the rotational speed of the feed roll. The controller 204 is in electronic communication with two sensors: a speed sensor 206 and a control valve sensor 207. The speed sensor 206 is located near or on a PTO shaft 205, and can determine the rotational speed of the PTO shaft 205. The control valve sensor 207 is located near or on the control valve 203, and can determine the rate of fluid flow through the control valve. In some embodiments, the speed sensor 206 and the control valve 207 can provide information back to the controller 204 in real-time. The controller 204 can use the information from the speed sensor 206 and the control valve sensor 207 to adjust the position of the control valve 203 such that the hydraulic fluid flow through the motor 201 causes the rotational speed of the feed roll to change, such that the ratio of the rotational speed of the PTO shaft to the rotational speed of the feed roll is maintained or approximately maintained during the operation of the system.

Figure 3:
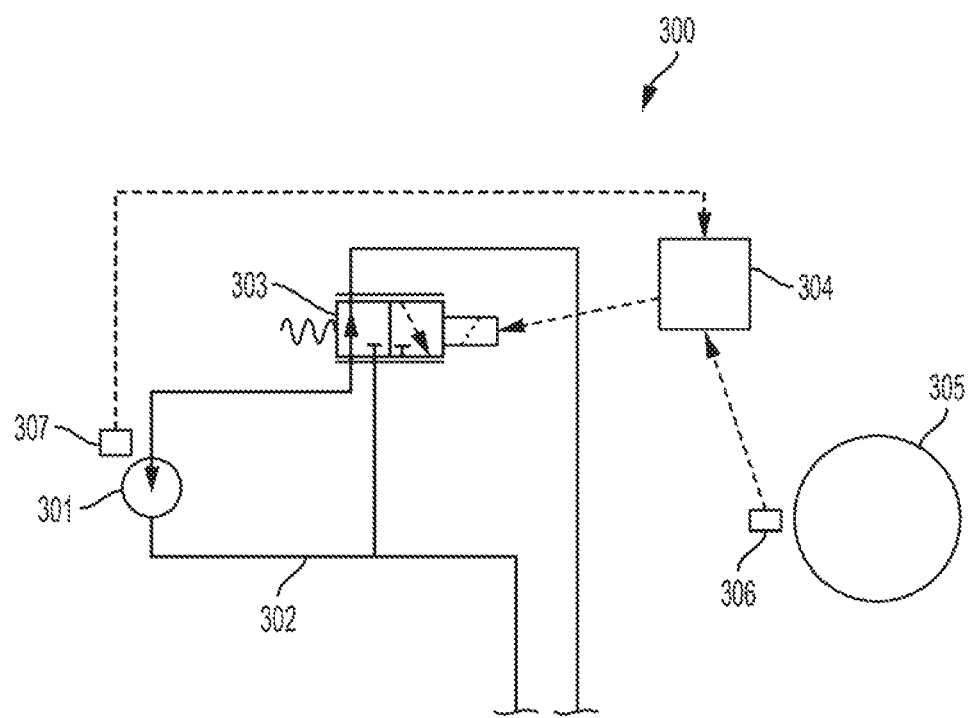
FIG. 3 depicts a hydraulic schematic showing a system with a speed sensor and a feed roll sensor.

FIG. 3 depicts another embodiment of a hydraulic control system in a harvester, generally labeled 300. A hydraulic motor 301 is operable connected to and capable of rotating a feed roll (not shown), and is powered by hydraulic fluid moving through a hydraulic circuit 302 that is a part of a larger tractor EHR system (not shown). A control valve 303 is positioned such that it controls the rate of fluid flow moving through the motor 301, and thus the rotational speed of the feed roll. A controller 304 is in electronic communication with the control valve 303 and can adjust the position of the valve 303 to vary the rate of fluid flow moving through the motor 301. In this manner the controller 304 is can adjust the rotational speed of the feed roll. The controller 304 is in electronic communication with two sensors: a speed sensor 306 and a feed roll sensor 307. The speed sensor is located near or on a PTO shaft 305, and can determine the rotational speed of the PTO shaft 305. In some embodiments, the speed sensor is located near or on any mechanical drive directly linked to the PTO shaft. The feed roll sensor 307 is located near or on the motor 301, and can determine rotational speed of the feed roll. In some embodiments, the speed sensor 306 and the feed roll sensor 307 can provide information back to the controller 304 in real-time. The controller 304 can use the information from the speed sensor 306 and the feed roll sensor 307 to adjust the position of the control valve 303 such that the hydraulic fluid flow through the motor 301 causes the rotational speed of the feed roll to change, such that the ratio of the rotational speed of the PTO shaft to the rotational speed of the feed roll is maintained or approximately maintained during the operation of the system.

Figure 4:
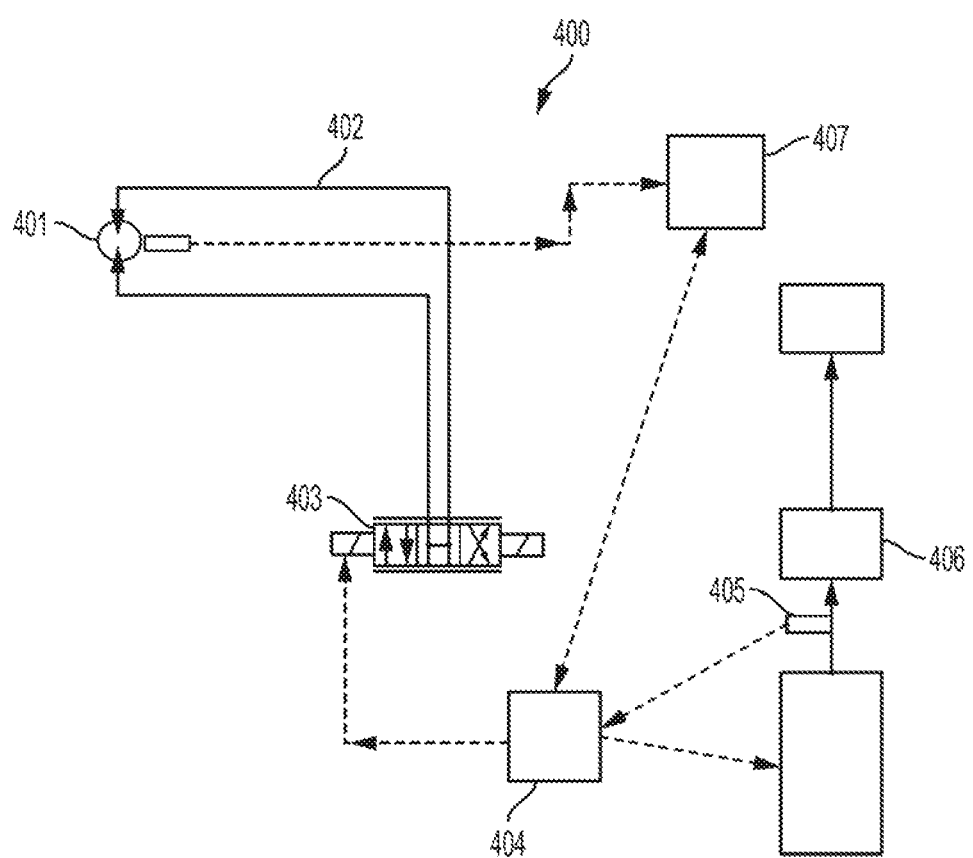
FIG. 4 depicts a hydraulic schematic showing a system with two controllers in electronic communication.

FIG. 4 depicts yet another embodiments of a hydraulic control system in a harvester, generally labeled 400. A hydraulic motor 401 is operable connected to and capable of rotating a feed roll (not shown), and is powered by hydraulic fluid moving through a hydraulic circuit 402 that is a part of a larger tractor EHR system (not shown). A control valve 403 is positioned such that it controls the rate of fluid flow moving through the motor 401, and thus the rotational speed of the feed roll. In the present embodiment, the control valve 403 is located within the associated tractor. In some embodiments, the control valve 403 is located within the harvester. A tractor controller 404 is in electronic communication with the control valve 403 and can adjust the position of the valve 403 to vary the rate of fluid flow moving through the motor 401. In this manner the tractor controller 404 can adjust the rotational speed of the feed roll. The tractor controller 404 is also in electronic communication with a speed sensor 405. The speed sensor 405 is located near or on a PTO shaft 406, and can determine the rotational speed of the PTO shaft 406. A harvester controller 407 is in electronic communication with a feed roll sensor 407. The feed roll sensor 407 is located near or on the motor 401, and can determine rotational speed of the feed roll. In some embodiments, the speed sensor 405 and the feed roll sensor 407 can provide information back to their respective controllers in real-time. The tractor controller 404 and the harvester controller 407 are in electronic communication with each other. In some embodiments, the tractor controller 404 and the harvester controller 407 are connected by ISOBUS. The tractor controller 404 can adjust the position of the control valve 403 so that the hydraulic fluid flow through the motor 201 causes the rotational speed of the feed roll to change, such that the ratio of the rotational speed of the PTO shaft to the rotational speed of the feed roll is maintained or approximately maintained during the operation of the system.

Having described a series of embodiments, it will become apparent that various modifications can be made without departing from the scope of the disclosure as defined in the accompanying claims. Various publications, including patents, published applications, technical articles and scholarly articles are cited throughout the specification. Each of these cited publications is incorporated by reference herein in its entirety.

What is claimed is:

1. A system comprising:
    a feed roll system comprising:
        (i) a crop feed roll positioned transversely between at least two sidewalls and configured for feeding crop to a bale chamber, the crop feed roll capable of rotation about a feed roll axis;
        (ii) a motor, operably connected to the feed roll and in fluid communication with a hydraulic circuit, the motor capable of rotating the feed roll about the axis; and
        (iii) a control valve, operably connected to and capable of controlling the rate of fluid flow through the hydraulic circuit;
    a power take off (PTO) system comprising a PTO shaft capable of rotation about a PTO axis, and
    at least a first controller, in electronic communication with the control valve, capable of adjusting the rotational speed of the feed roll about the feed roll axis;

wherein the at least two sidewalls are configured for attachment to a frame of a harvester;
wherein the PTO system further comprises a speed sensor capable of determining the real-time rotational speed of the PTO shaft; and wherein the at least a first controller is in electronic communication with the control valve and the speed sensor,
a feed roll sensor in electronic communication with the at least a first controller, the feed roll sensor capable of determining the rotational speed of the feed roll about the axis,
wherein the at least a first controller is capable of determining the rotational speed of the feed roll by the feed roll sensor, and wherein the at least a first controller is capable of adjusting the position of the control valve based on input from the feed roll sensor and the PTO speed sensor such that the ratio of the rotational speed of the PTO shaft to the rotational speed of the feed roll is maintained or approximately maintained during the operation of the system;
and
wherein the control valve has:
a first position, wherein the control valve is maximally open, and the rate of fluid flow through the hydraulic circuit is unrestricted;
a second position, wherein the control valve is maximally closed, and the rate of fluid flow through the hydraulic circuit is zero or is approximately zero; and
a plurality of positions between the first position and the second position, wherein the control valve is from about maximally open to about maximally closed, and the rate of fluid flow through the hydraulic circuit is proportional to the open percentage of the control valve.

2. The system of claim 1, wherein the motor increases the rotational speed of the feed roll about the axis as the rate of fluid flow through the hydraulic circuit increases; and wherein the motor decreases the rotational speed of the feed roll about the axis as the rate of fluid flow through the hydraulic circuit decreases.

3. The system of claim 1, wherein the speed sensor is located on the PTO shaft.

4. A harvester comprising:
a bale chamber;
a feed roll system comprising:
(i) a crop feed roll configured for feeding crop to the bale chamber, positioned transversely between at least two sidewalls, capable of rotation about a feed roll axis;
(ii) a motor, operably connected to the feed roll and in fluid communication with a hydraulic circuit, the motor capable of rotating the feed roll about the axis; and
(iii) a control valve, operably connected to and capable of controlling the rate of fluid flow through the hydraulic circuit;
a power take off (PTO) system comprising a PTO shaft capable of rotation about a PTO axis,
a speed sensor capable of determining the real-time rotational speed of the PTO shaft;
a feed roll sensor capable of determining the rotational speed of the feed roll about the axis; and
at least a first controller, in electronic communication with the control valve, the speed sensor and the feed roll sensor, the first controller capable of adjusting the rotational speed of the feed roll about the feed roll axis;
wherein the at least a first controller is capable of determining the rotational speed of the feed roll by the feed roll sensor, and wherein the at least a first controller is capable of adjusting the position of the control valve based on input from the PTO speed sensor and the feed roll sensor such that the ratio of the rotational speed of the PTO shaft to the rotational speed of the feed roll is maintained or approximately maintained during the operation of the feed roll system;
wherein the at least two sidewalls are configured for attachment to a frame of the harvester;
wherein the motor increases the rotational speed of the feed roll about the axis as the rate of fluid flow through the hydraulic circuit increases; and wherein the motor decreases the rotational speed of the feed roll about the axis as the rate of fluid flow through the hydraulic circuit decreases; and
wherein the control valve has:
(i) a first position, wherein the control valve is maximally open, and the rate of fluid flow through the hydraulic circuit is unrestricted;
(ii) a second position, wherein the control valve is maximally closed, and the rate of fluid flow through the hydraulic circuit is zero or is approximately zero; and
(iii) a plurality of positions between the first position and the second position, wherein the control valve is from about maximally open to about maximally closed, and the rate of fluid flow through the hydraulic circuit is proportional to the open percentage of the control valve the rate of fluid flow through the hydraulic circuit is proportional to the open percentage of the control valve.

5. The harvester of claim 4, further comprising:
(i) the speed sensor capable of determining the real-time rotational speed of the PTO shaft;
(ii) the feed roll sensor capable of determining the rotational speed of the feed roll about the axis; and
(iii) at least a second controller;
wherein the at least a first controller is in electronic communication with the control valve, the speed sensor, and the at least second controller;
wherein the at least a second controller is in electronic communication with the feed roll sensor, and the at least first controller;
wherein the at least a second controller is capable of determining the rotational speed of the feed roll by the feed roll sensor, and
wherein the at least a first controller is capable of adjusting the position of the control valve such that the ratio of the rotational speed of the PTO shaft to the rotational speed of the feed roll is maintained or approximately maintained during the operation of the feed roll system.

6. A method of controlling the rotational speed of a feed roll comprising:
determining, by a speed sensor, the rotational speed of a PTO shaft;
determining the rotational speed of a feed roll by a feed roll sensor;
calculating, by at least a first controller, the ratio of the rotational speed of the PTO shaft to the rotational speed of the feed roll;
adjusting, by a control valve, the rotational speed of the feed roll wherein the rotational speed of the feed roll is adjusted such that the ratio of the rotational speed of the PTO shaft to the rotational speed of the feed roll is maintained or approximately maintained of the feed roll system.

* * * * *